Oct. 2, 1956 V. J. LOUDEN 2,765,374

MAGNETIC AMPLIFIER

Filed Aug. 18, 1952

Inventor:
Victor J. Louden,
by Richard E. Hosley
His Attorney.

2,765,374

MAGNETIC AMPLIFIER

Victor J. Louden, Schenectady, N. Y., assignor to General Electric Company, a corporation of New York Application August 18, 1952, Serial No. 304,891

4 Claims. (Cl. 179—171)

My invention relates to magnetic amplifiers, and more particularly to means for minimizing the input power required to compensate for inequalities in opposed amplifying devices connected in push-pull relation.

In push-pull type direct current magnetic amplifiers wherein two amplifying devices are provided with output circuits connected together in back-to-back relation, it is found in practice that inequalities in the opposed devices, as due to slightly different temperature and aging characteristics in rectifiers or other components, cause displacement of the individual gain characteristics of the opposed devices so that the combined gain characteristic is no longer marked by zero output for zero input signal. Such an effect has been referred to as "zero wander" because the amount and direction of the unbalance varies over the amplifier life as the elements causing the inequality vary in their aging characteristics. Specifically, such inequalities mean that a certain amount of positive or negative control signal voltage and input power is required to maintain the amplifier output voltage at zero.

A magnetic amplifier operated from a source of control signal voltage frequently has to satisfy several operating conditions. For example, it is not uncommon to specify that a particular amplifier have at once a predetermined time constant, a predetermined or minimum input impedance, and a minimum power required to compensate for zero wander. These requirements are at times difficult to meet because, for a given time constant, the power required to compensate for zero wander increases as the input impedance increases. This is because, when a predetermined number of ampere turns in the input winding are required to maintain the amplifier output of zero, the necessary signal voltage to maintain the required input current increases as the input circuit impedance increases. Thus, when high input impedance circuits are required, the concurrent requirement of low power input to correct for zero wander becomes difficult to attain.

Accordingly, therefore, it is a principal object of my invention to provide new and novel means for minimizing the power required to correct zero wander in magnetic amplifiers having a high input impedance.

In carrying out my invention in one form, I so connect the input and output terminals of a direct current push-pull magnetic amplifier that the output voltage or a part thereof is connected in series opposition to the signal voltage in the input circuit of the amplifier. With such an input circuit connection, the actual or physical input impedance may be low so that with no load or output voltage the power required to correct for zero wander is small, while the opposing voltage component from the load makes the input circuit appear to have the required high impedance when operating under load.

My invention itself will be more fully understood and its various objects and advantages further appreciated by referring now to the following detailed specification taken in conjunction with the accompanying drawing, in which.

Figure 1:
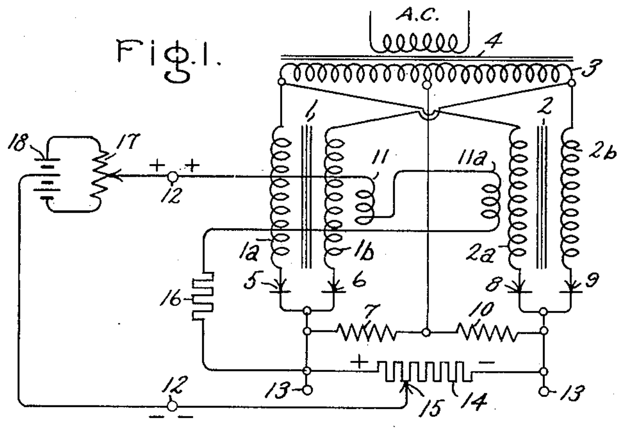
Fig. 1 is a schematic circuit diagram of a magnetic amplifier circuit embodying my invention.

Referring now to the drawing, I have shown at Fig. 1 a direct current push-pull magnetic amplifier in which two saturable core devices 1 and 2, each having pairs of load windings 1*a*, 1*b* and 2*a*, 2*b*, respectively, are similarly connected to the secondary winding 3 of an alternating current supply transformer 4, with their output circuits connected together in opposed or back-to-back relation. More specifically, the windings 1*a* and 1*b* are each connected at one end to opposite ends of the supply transformer secondary winding 3, and the opposite ends of the windings 1*a* and 1*b* are connected through similarly poled unilateral conducting devices or rectifiers 5 and 6, respectively, to one end of an output resistor 7, the opposite end of which is connected to a center tap on the supply transformer winding 3. The load windings 2*a* and 2*b* of the saturable core device 2 are similarly connected through rectifiers 8 and 9, respectively, and an output resistor 10. Direct current control windings 11 and 11*a* are wound upon the cores of the saturable devices 1 and 2, connected in series circuit relation. The control windings are so arranged that control signal current of one polarity aids saturation of one of the saturable devices, while control signal current of the opposite polarity aids saturation of the other saturable core device. The control windings 11 and 11*a* are connected in an input circuit between a pair of amplifier input terminals 12, and the remote terminals of the interconnected output resistors 7 and 10 are connected to a pair of amplifier output terminals 13.

Between the amplifier output terminals 13, I connect a voltage divider 14 having an adjustable tap 15, and between one end of the control winding 11*a* and one end of the voltage divider 14, I connect an input resistor 16. The control winding 11 is connected to one input terminal 12, and the tap 15 on the voltage divider 14 is connected to the other input terminal 12, thereby to connect the control windings 11 and 11*a*, the resistor 16 and at least a portion of the voltage divider 14 in series circuit relation in an input circuit included between the input terminals 12. Any desired source of unidirectional control signal voltage, shown by way of example as a potentiometer 17 connected across a battery 18, is connected to the input terminals 12. The portion of the voltage divider 14 included in the input circuit is so oriented in polarity that the portion of the output voltage appearing thereacross is in series opposition with the control signal voltage of the source 17 for any predetermined polarity of the signal voltage.

It will now be evident to those skilled in the art that, in operation, each of the saturable core devices 1 and 2 is of the self-saturating type known as an amplistat, by reason of the unilateral conducting device connected in series circuit relation with each load winding thereof. Such a device has an output characteristic of the form shown at the curves A and A' of Fig. 2, the curve A representing the output of that device which is saturated in the presence of control currents of positive polarity, and the curve A' representing the output of that device which is saturated in the presence of control currents of negative polarity. At Fig. 2, the abscissae represent signal input in terms of signal input voltage $V_s$ or the ampere turns $NI_s$ in the control windings 11 and 11*a*, while the ordinates of the curves represent amplifier load or output current between the terminals 13. It will be further understood that with the output of resistors 7 and 10 connected together in back-to-back relation as illustrated at Fig. 1, the combined gain characteristic of the device between the pairs of terminals 12 and 13 is illustrated by the curve A—A' of Fig. 3. This curve A—A' is, of course, drawn for ideal conditions in which the characteristics of the saturable core devices 1 and 2 and their associated rectifiers and other components are properly balanced, so that the gain curve demonstrates zero output for zero input.

In practice, however, it is found that the oppositely connected saturable core devices 1 and 2 and their associated components, such as the rectifiers 5, 6 and 8, 9, do not always demonstrate precisely the same characteristics, but are subject to inequalities arising from different temperature responses or different aging characteristics of the rectifiers or the like. As a result, the actual gain characteristic is displaced from zero, as illustrated at the curve B—B' of Fig. 3.

Figures 2, 3:
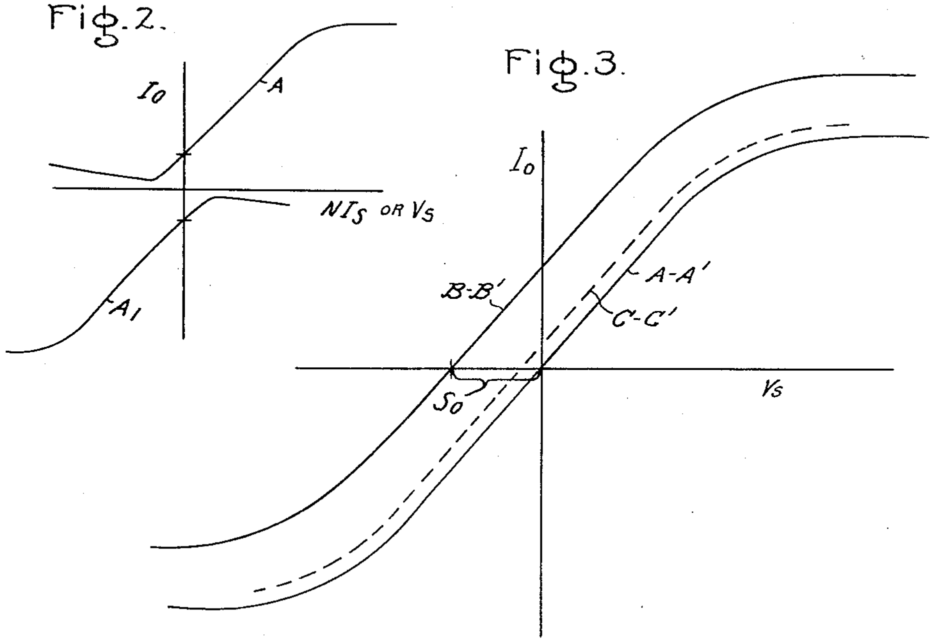
Figs. 2 and 3 are graphical representations of certain of the operating characteristics of the circuit shown at Fig. 1; and, Fig. 4 is a schematic circuit diagram, partially in block form, showing a magnetic amplifier embodying my invention in another form.

The displaced gain curve B—B' of Fig. 3 indicates that the signal circuit must supply negative ampere turns to the value S*o* in order to maintain the amplifier output zero. The amount of input power represented by this signal input depends upon the actual or physical impedance of the input circuit. In the circuit shown at Fig. 1, the input resistor 16 is small, and at zero amplifier output no opposing voltage appears across that portion of the voltage divider 14 which is included in the input circuit. The actual input impedance in the circuit of Fig. 1 is therefore small, so that the input power required to maintain zero amplifier output is small.

On the other hand, when an output voltage appears at the terminals 13 so that current is supplied by the amplifier of Fig. 1 to any connected load device, the opposing voltage appearing across the portion of the voltage divider 14 included in the input circuit increases the apparent impedance of this circuit to a value sufficient to meet high input circuit requirements. Thus, it will be evident that with my new and improved circuit the amount of input power required to correct for zero wander is considerably less than that which would appear to be necessary as a result of the high apparent input impedance of the amplifier under load conditions. Therefore, the apparent zero wander of the amplifier is appreciably less than that actually caused by the irregularities of the circuit components and may be represented as by the dotted curve C—C' of Fig. 3.

Figure 4:
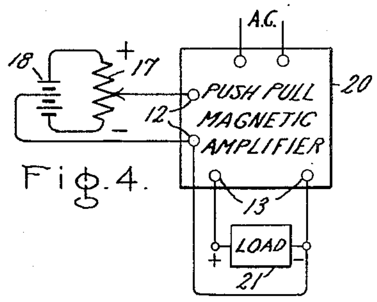

It will now be appreciated by those skilled in the art that, while I have chosen to illustrate my invention as applied to a center tapped magnetic amplifier of the self-saturating direct current type, it is equally applicable to other direct current and alternating current magnetic amplifiers of the push-pull type. Moreover, my invention is, of course, not limited in its application to the inclusion of only a portion of the load or output voltage in the input circuit. The negative or degenerative feedback voltage derived from the amplifier output and supplied to the input circuit may be taken across all or a part of a separate output voltage divider, as at Fig. 1, or across all or part of an actual load device serving as a voltage divider. At Fig. 4, I have shown, in block form, a magnetic amplifier 20 similar to the amplifier of Fig. 1 and wherein like parts have been assigned the same reference numerals. At Fig. 4, however, the amplifier is shown connected to an electric load device 21, and the device 21 is connected in series in the input circuit in voltage opposition to the control signal voltage from the source 17, 18.

Therefore, while I have described only a preferred embodiment of my invention by way of illustration, many modifications will occur to those skilled in the art, and I therefore wish to have it understood that I intend in the appended claims to cover all such modifications as fall within the true spirit and scope of my invention.

What I claim as new and desire to secure by Letters Patent of the United States is:

1. In a magnetic amplifier having a push-pull output, means for minimizing the input power from a biasing source required to compensate for unbalance thereof while providing a high impedance input thereinto for coupling said amplifier to high impedance input circuitry, said means including an input winding for receiving an input signal, a low value matching impedance including a resistance in series circuit with said input winding to increase the impedance thereof, means for transmitting a biasing signal through said input winding for additionally energizing said input winding, and means for degeneratively feeding back into said input winding a signal proportional to said push-pull output, whereby a combined signal proportional to the sum of said input signal, said biasing signal, and said feedback signal directly energizes said input winding.

2. In the apparatus of claim 1, said matching impedance comprising a substantially pure resistance element.

3. In the apparatus of claim 2, said biasing source being in series circuit relation with said input winding.

4. In the apparatus of claim 3, said means for degeneratively feeding back into said input winding a signal proportional to said push-pull output, including a second resistance across the push-pull output of said amplifier and means for connecting a portion of said second resistance in series circuit relation with said matching resistance.

References Cited in the file of this patent

UNITED STATES PATENTS

| | | |
|---|---|---|
| 2,464,639 | Fitzgerald | Mar. 15, 1949 |
| 2,503,039 | Glass | Apr. 4, 1950 |
| 2,644,129 | Ramey | June 30, 1953 |
| 2,657,281 | Kluz | Oct. 27, 1953 |